ized Patent [19]

United States Patent [19]
Drake et al.

[11] Patent Number: 4,588,704

[45] Date of Patent: May 13, 1986

[54] RECOVERY OF INERT HYDROCARBON DILUENTS USED IN PREPARATION OF CATALYSTS

[75] Inventors: Charles A. Drake; Bill Loffer, both of Bartlesville, Okla.

[73] Assignee: Phillips Petroleum Company, Bartlesville, Okla.

[21] Appl. No.: 728,909

[22] Filed: Apr. 30, 1985

[51] Int. Cl.$^4$ .................... C08F 4/62; C08F 4/64; C08F 4/68
[52] U.S. Cl. ........................... 502/111; 502/134
[58] Field of Search .................... 502/111, 134

[56] References Cited

U.S. PATENT DOCUMENTS

| | | | |
|---|---|---|---|
| 2,913,447 | 11/1959 | Jacob et al. | 260/94.9 |
| 2,963,520 | 12/1960 | Neal | 260/676 |
| 3,153,027 | 10/1964 | Hagemeyer et al. | 260/94.9 |
| 3,484,427 | 12/1969 | Hillman | 260/94.7 |
| 4,211,670 | 7/1980 | Vandenberg | 502/111 X |
| 4,363,746 | 12/1982 | Capshew | 502/154 |

*Primary Examiner*—Patrick P. Garvin
*Attorney, Agent, or Firm*—French and Doescher

[57] ABSTRACT

In a catalyst preparation process wherein effluent solvent or diluent is water washed to remove impurities and subsequently recycled to the process, the formation of solids upon mixing organic and aqueous phases is prevented by the admixture in appropriate proportions of effluent portions containing, e.g., an organoaluminum compound such as ethylaluminum sesquichloride and a transition metal tetrahalide such as titanium tetrachloride, respectively, then mixing with water, followed by optional neutralization of the acidic aqueous phase with a chemical base such as NH$_4$OH.

29 Claims, No Drawings

RECOVERY OF INERT HYDROCARBON DILUENTS USED IN PREPARATION OF CATALYSTS

This invention relates to the production of catalysts. In another aspect this invention relates to the recovery of a diluent used in the preparation of catalysts.

In various processes and reactions where solvents or diluents are used, and particularly in processes where catalysts are prepared or used, several problems in the recovery and purification of such solvents or diluents exist. A solvent is typically used as a reaction medium for species dissolved therein, while a diluent is used to suspend or wash materials which are insoluble therein. For convenience, both will be referred to as "diluents" in part of the discussion herein. For reasons of economy and environmental protection, it is customary to recycle the diluent repeatedly through the chemical processes, employing separation steps such as fractionation, steam-stripping and adsorption for repurification purposes. In many cases these methods of diluent treatment are only partially successful in practice, since, e.g., it is difficult to keep catalyst poisons at a minimum concentration. Due to the diverse and numerous impurities which may be picked up by such diluents during their use in chemical processes, it is often technically difficult or uneconomical to recover such diluents and process them to successfully remove impurities to the degree required for recycling said diluents in the processes involved. Improved methods for the purification and recycling of solvents and diluents are needed, particularly methods providing for economical disposition of separated impurities, waste liquids, etc.

As an illustration there are certain processes for the preparation of catalysts such as, for example, olefin polymerization catalysts, in which large amounts of diluents or solvents (up to, e.g., 100 pounds per pound of catalyst) are used to provide a reaction medium, to wash the product free of impurities, etc. In such processes, it is highly desirable to recover and recycle most of said diluent. Typically, an inert hydrocarbon is used as the solvent or diluent, and some form of a water wash process is used to remove various impurities from the hydrocarbon diluent before recycling. However, in some instances the use of an aqueous caustic wash results in the precipitation of large amounts of solids which make a proper separation very difficult. The use of only a water wash eliminates the solids in one case but produces gels which trap the diluent in another case. Thus, improved methods for recovery of diluent are needed.

For example, in a process for producing a catalyst involving reactants comprising an organoaluminum halide such as, for example, ethylaluminum sesquichloride and a titanium halide such as titanium tetrachloride, a portion of an inert hydrocarbon diluent which has been contacted principally with the organoaluminum halide, when subjected to a caustic wash, undergoes a vigorous reaction with the precipitation of solids which precludes the further processing of the diluent for further purification and recycling, since the precipitated solids make the liquid almost impossible to pour. Similarly, when a portion of the diluent which has been exposed principally to the titanium halide is subjected to a caustic wash, a very large amount of potassium hydroxide is required to remove the impurities. On the other hand, with a neutral water wash, the portion of diluent contacted with the organoaluminum halide is purified satisfactorily, but the portion contacted with the titanium halide produces a gel material which interferes with the purification of the diluent. Clearly, improved methods for handling such contaminated diluents are needed.

An object of this invention is the recovery of diluent used in catalyst preparation. Another object of this invention is to provide a method for recycling diluents. A further object of this invention is to provide an effective and economical method for treating diluents for recycling in processes for the preparation of catalysts.

In accordance with the invention we have discovered that, in processes for the preparation of certain catalysts, when portions of the solvent or diluent which have been contacted with two separate reagents are subjected to water wash processes, certain problems arise; however, when said portions of the diluent are combined in certain proportions and then subjected to a water wash process, the resulting admixture of diluent portions can be successfully water washed to remove impurities and further processed for successful recycling in the process.

It was surprisingly found that this procedure recovers a higher amount of the diluent than has heretofore been obtainable, permits the amount of wash water to be minimized, permits the use of smaller process equipment and reduces the volume of waste water to be disposed of in environmentally acceptable ways.

In the process described above for production of a polymerization catalyst, we have discovered that by combining in suitable proportions the portions of organic solvent or diluent which have been contacted with organoaluminum halide and titanium halide, respectively, the resulting admixture can be washed at least once with water, optionally followed by a base, without adverse reactions or the excessive production of precipitates or gels, and the organic phase of diluent can subsequently be easily separated from the water phase for further purification and recycle into the process for production of the polymerization catalyst.

Other aspects, objects, and several advantages of this invention will become apparent from a study of this disclosure and the appended claims.

In accordance with this invention, organic solvent and/or diluent is separated from a reaction zone for the preparation of a catalyst in two separate portions corresponding to the washing of catalyst or catalyst precursor at two different stages in the catalyst preparation. The portions of solvent and/or diluent are then combined in appropriate proportions and washed at least once with water, optionally containing added base, to remove inorganic and other water soluble impurities before completing the purification and recycling the organic diluent to the process for catalyst preparation.

This process is useful for purifying diluents used in processes for the preparation of catalysts for the polymerization of olefins, which processes comprise contacting a metal halide compound and a transition metal compound to produce a reaction product and then contacting the resulting reaction product with a transition metal tetrahalide. This process is particularly useful for the purification of diluents used in the processes for production polymerization catalysts disclosed by Capshew in U.S. Pat. No. 4,363,746 (1982), the disclosure of which is incorporated herein by reference. Briefly, the catalyst is prepared under the Capshew method by mixing together two reactants, e.g., a metal halide compound and a transition metal compound, in a suitable solvent, such as a hydrocarbon solvent, to produce a first catalyst component solution, which is heated, cooled and optionally filtered to remove any undissolved material; a second catalyst component comprising a precipitating agent is then added to the first catalyst component solution to produce a solid catalyst precursor in the form of a slurry with the solvent, and the solid catalyst precursor is separated from the slurry and washed repeatedly with a hydrocarbon compound. The solid catalyst precursor is then treated with a transition metal tetrahalide and the resulting solid catalyst is washed repeatedly with a hydrocarbon diluent. Optionally, the reaction product of the two reactants (e.g., the metal halide compound and the transition metal compound) can be treated with ethylene gas, generally in the presence of additional precipitating agent, prior to treatment with the transition metal tetrahalide, thus forming a "prepolymer" which forms a component of an improved catalyst.

In such processes for the production of polymerization catalysts, the process of the present invention begins with the separate collection and accumulation of portions of solvent and/or diluent, hereinafter referred to simply as diluent for convenience, which have been exposed to, e.g., the organoaluminum halide and titanium tetrahalide reagents which are commonly used is the precipitating agent and the halide ion exchanging source, respectively. After collection in conventional apparatus, suitable quantities of the resulting two portions or types of diluent are combined in a vessel suitable for water washing, in appropriate proportions to minimize the formation of precipitates, gels, etc. Normally it is found that the portions of diluent can preferably be combined in approximately equal quantities by volume, but depending upon their relative concentrations of impurities, they can be combined in proportions ranging between 3:7 and 7:3 ratio by volume, and preferably in proportions ranging from about 4:6 to about 6:4 ratio by volume. Concentrations of impurities can be determined by testing portions of diluent removed at various stages of the process, or estimated by calculations, as shown in Example I. The concentrations of the organoaluminum halide and the titanium tetrahalide in the separate wash solutions which are combined can be up to about 20 percent by weight of said separate solutions. For best results, it has been found that the result of combining the separate solutions with a suitable amount of water should be a neutral or an acidic solution, i.e., having a pH of no more than about 7, to prevent premature precipitation of metal compounds.

The titanium tetrahalide is believed to tend to form an acidic solution when water is added to the solution containing titanium halide, due to hydrolysis, according to the equation

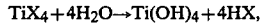

$$TiX_4 + 4H_2O \rightarrow Ti(OH)_4 + 4HX,$$

where X is a halide ion. Since HX will be a strong acid and $Ti(OH)_4$ is a weak base, the result will be an acidic solution. On the other hand, when water is added to the solution containing the organoaluminum halide, it is believed that the tendency is to form basic aluminum species which can partially neutralize the acids in the combined solution, or form gels such as $Al(OH)_3$ under certain conditions. The solution of titanium tetrahalide and the solution of organoaluminum halide should thus be combined and mixed with water in such proportions that these metal hydroxide species are soluble, avoiding or minimizing the formation of precipitated solids or gels. On the other hand, these solutions and water are preferably combined in proportions which produce a combined solution not much more acidic than necessary to accomplish this objective, to minimize expense, hazards in handling and disposal problems.

The solutions can be advantageously combined in proportions, depending upon their concentrations, such that the resulting combined solution contains at least two moles of transition metal tetrahalide, for example titanium tetrahalide, for each mole of aluminum in the organoaluminum halide. If the combined solution is not acidic enough when water is added, more of the titanium halide solution can be added. Alternatively, a suitable acid can be added to adjust the pH. The acid used can be any water-soluble mineral acid, but is preferably a halo-acid having the same halide ion as the titanium tetrahalide and/or the organoaluminum halide. For example, when an organoaluminum chloride and titanium tetrachloride are used, HCl is preferably used for any pH adjustments which are to be made by the addition of acid.

The resulting combined solution containing titanium tetrahalide and organoaluminum halide is preferably washed with a volume of water at least equal to about 1.5 times the volume of the combined solutions, and effective to reduce the quantity of precipitated solids to an acceptable level. The phases are then allowed to separate and the organic phase removed by decantation or a similar process for further purification and/or recycle to the washing process. The aqueous phase can then optionally be neutralized by introducing a chemical base. A convenient means for effecting such neutralization is to bubble in ammonia gas, but a base in solution such as ammonium hydroxide, a basic nitrogen-containing compound, or an alkali metal or alkaline earth metal hydroxide can also be added to the aqueous phase to achieve the desired neutralization.

The process of this invention is generally applicable to processes for preparation of catalysts for the polymerization of olefins as disclosed in U.S. Pat. No. 4,363,746 (1982) which comprise reacting a metal halide compound and a transition metal compound, then contacting the product of said reaction with a precipitating agent and further reacting the product of said reaction with a transition metal tetrahalide, wherein all the above steps are conducted in a suitable diluent and wherein the solid catalyst product is washed at least twice in a suitable diluent (at least once after addition of the precipitating agent and at least once after the addition of the transition metal tetrahalide), with the inventive process for purification of effluent diluent comprising the following steps:

(a) collecting separate portions of said diluent which have been contacted respectively with said precipitating agent and said transition metal tetrahalide, (b) combining appropriate proportions of said separate portions of said diluent with an effective amount of water to produce an acidic combined diluent mixture, (c) washing said combined diluent mixture with said water, (d) separating the resulting organic and aqueous phases, and (e) recovering a washed diluent mixture for further purification and recycling in said process for preparation of a catalyst. The waste wash water and impurities contained therein can be prepared for disposition in an environmentally acceptable manner, or can be further processed for recovery of the metal values contained in the reagents used in the catalyst production process.

The metal halide compounds useful in the olefin polymerization catalyst production process to which this invention is applicable can be selected from the group consisting of metal dihalide compounds and metal hydroxyhalide compounds, with the metal selected from among the metals in Group IIA and IIB of the Periodic Table of the Elements. In practice, it has been found that the preferred metal halide compounds are magnesium dihalides, with magnesium dichloride particularly preferred, due to cost, effectiveness and availability.

The transition metal compounds useful in the olefin polymerization catalyst production process to which this invention is applicable comprise a transition metal selected from among the transition metals in Group IVB and Group VB of the Periodic Table of the Elements, preferably titanium, zirconium and vanadium, with titanium being particularly preferred due to effectiveness, cost and availability. Suitable transition metal compounds include organotitanium compounds selected from the group consisting of titanium tetrahydrocarbyloxides, titanium tetraimides, titanium tetraamides and titanium tetramercaptides. The titanium tetrahydrocarbyloxides are selected from the group expressed by the general formula $$Ti(OR)_4,$$

wherein each R is individually selected from the group consisting of alkyl, cycloalkyl, aryl, alkaryl and aralkyl hydrocarbon radicals, each containing from 1 to about 20 carbon atoms per radical, and wherein each R can be the same or different. Preferably, the hydrocarbyl radicals of the titanium tetrahydrocarbyloxide compounds contain from 1 to about 10 carbon atoms per radical, and a particularly preferred compound for use is titanium tetraethoxide due to cost, effectiveness and availability.

The precipitating agents useful in the olefin polymerization catalyst production processes to which this invention is applicable are selected from the group consisting of organometallic compounds in which the metal is selected from the metals of Groups I, II and III of the Periodic Table of the Elements, halides and oxygen-containing halides of elements selected from the Groups IIIA, IVA, IVB, VA and VB of the Periodic Table of the Elements, hydrogen halides and organic acid halides expressed in the formula $$\underset{\|}{R'}-\underset{O}{\overset{\|}{C}}-X,$$

wherein R' is an alkyl, aryl or cycloalkyl group or combination thereof containing from 1 to about 12 carbon atoms and X is a halogen atom. Typically, a suitable organometallic compound can be selected from the group consisting of lithium alkyls, Grignard reagents, dihydrocarbyl magnesium compounds and organoaluminum compounds. Presently preferred in said catalyst production processes is an organoaluminum compound consisting essentially of an organoaluminum halide compound selected from the group consisting of dihydrocarbylaluminum monohalides of the formula $$(R)_2AlX,$$

monohydrocarbylaluminum dihalides of the formula $$RAlX_2,$$

and hydrocarbylaluminum sesquihalides of the formula $$(R)_{hd 3}Al_2X_3,$$

wherein each R in the above formulas is individually selected from the group of alkyl, cycloalkyl, aryl, alkaryl and aralkyl hydrocarbon radicals, each containing from 1 to about 20 atoms per radical, and wherein each R can be the same or different, and wherein each X is a halogen atom and can be the same or different. As illustrated in the examples, a commonly used example of said organoaluminum halide compounds is ethylaluminum sesquichloride.

Various transition metal tetrahalides can be used in the olefin polymerization catalyst production processes to which this invention is applicable, but titanium tetrahalides are presently preferred due to effectiveness, availabity and cost, with titanium tetrachloride being particularly preferred.

The instant invention is applicable to the purification of solvents or diluents, hereinafter referred to as diluents for convenience, used in the catalyst production processes disclosed generally herein and in detail in U.S. Pat. No. 4,363,746, and is further applicable to other processes using similar reagents which produce effluent streams of diluents containing impurities which tend to form precipitated solids or gels upon water washing and wherein at least two separate steps are involved employing washing or otherwise separating catalyst components from diluent. The diluent is generally selected to be inert to reactants of the catalyst production process comprising, e.g. the metal halide compound and the transition metal compound used in the process described herein. By "inert", it is meant that the diluent does not chemically react with the dissolved components so as to interfere with the formation of the product or the stability of the product once it is formed. The diluents are inert liquids (under process conditions) selected from the group consisting of saturated and aromatic hydrocarbons having 1 to about 16 carbon atoms, halogenated hydrocarbons, saturated ethers including saturated cyclic ethers and mixtures of two or more of the above. In practice, the presently preferred inert diluents are saturated hydrocarbons comprising normal alkanes having from about 5 to about 10 carbon atoms, with n-hexane being particularly preferred due to availability, effectiveness and cost.

Once the diluent has been washed with water, the aqueous phase of a combined portion of diluent and water can optionally be neutralized with a chemical base. The chemical base can be selected from the group consisting of ammonia, basic nitrogen-containing compounds ammonium hydroxide and alkali metal hydroxides.

The improvements affected by this invention are illustrated in the following non-limiting examples:

EXAMPLE I

All reactions were carried out under a dry nitrogen atmosphere employing dry n-hexane as the reaction medium or diluent in a glass-lined reaction vessel. Anhydrous magnesium chloride (1 part), titanium tetraethoxide (4.5 parts by weight) and about 26 parts by weight of n-hexane were charged to the reactor. The mixture was heated to reflux (about 100° C.) and held at that temperature for about 30 minutes. Reactor contents were then cooled to about 30° C., and a 25% solution of ethylaluminum sesquichloride (EASC) in n-hexane diluent (about 9.8 parts by weight) was added slowly with stirring. When all of the EASC solution had been added (about 90 minutes), stirring was stopped and the precipitate allowed to settle. The mother liquor was drawn out of the reactor through a dip-tube equipped with a sight-glass. Liquid was drawn out until evidence of suspended solids was observed. This initial mother liquor was collected in a holding tank for subsequent treatment and recycle (solution #1). The concentration of EASC in the mother liquor was about 10 percent by weight.

The solids remaining in the reaction vessel were washed three times with about 23 parts, 15 parts and 15 parts by weight of n-hexane diluent, respectively. Each time, fresh diluent was added, the reactor contents were vigorously stirred for about 5 to about 10 minutes, then solids were allowed to settle for about 1 hour. EASC concentration in successive n-hexane washes was 3 percent, 1 percent and 0.5 percent by weight, respectively.

After the third wash, the slurry was purged twice with ethylene gas, then another aliquot of EASC (1.3 parts by weight of 25 percent solution) and 0.125 parts by weight of ethylene plus 15 parts by weight of fresh n-hexane were added to the thoroughly washed catalyst precursor prepared as described above. The reaction mixture was stirred for about 30 minutes after EASC addition was complete, then allowed to settle for about 30 minutes and n-hexane wash removed. The catalyst precursor was then washed with another 15 parts by weight aliquot of n-hexane as above.

Catalyst precursor that had been subjected to two EASC treatments and thorough n-hexane washing was then treated with titanium tetrachloride (3 parts by weight) dissolved in 15 parts by weight of fresh n-hexane diluent. The reactor contents were stirred for about one hour, then allowed to settle for about 30 minutes. The mother liquor was removed and collected for subsequent treatment and recycle (solution #2).

The resulting solid catalyst was washed 4 more times with aliquots of 23, 18, 18 and 18 parts by weight of n-hexane, respectively. The $TiCl_4$ concentration in the mother liquor was about 10 percent by weight, and was reduced to about 3 percent, 1 percent, 0.3 percent and 0.1 percent, respectively, upon subsequent washes.

EXAMPLE II

A variety of treatments were carried out using the mother liquors from EASC addition to the catalyst precursor (solution #1) and $TiCl_4$ addition to the catalyst precursor (solution #2). In each of runs 2–16, the treatment employed distilled water. The treatments employed and results obtained are presented in Table I.

TABLE I

| Run | Volume, mL Solution #1 | Volume, mL Solution #2 | Treatment | Result |
| --- | --- | --- | --- | --- |
| 1 | 50 | — | 4 mL 1N KOH | Precipitate, strong reaction, approx. 35 vol. % solids |
| 2 | — | 10 | (1) Dilute with 50 mL $H_2O$<br>(2) pH adjusted to neutral with 125 mL 0.1N KOH | White precipitate formed and filtered from milky liquid |
| 3 | — | 50 | (1) Extract 3 times with 100 mL aliquots of $H_2O$, separate organic and aqueous phases<br>(2) 3 aq. phases combined and pH adjusted from 1.19 to 7.1 with 79 mL of 1N KOH | 42 mL "clean" n-hexane (no "heavies" indicated by gas liquid chromatograph; Milky white aqueous phase |
| 4 | 50 | — | (1) Extract 3 times with 100 mL aliquots of $H_2O$, separate organic and aqueous phases<br>(2) 3 washes combined and pH adjusted from 4.29 to neutral with 13.2 mL of 1N KOH | 44 mL impure n-hexane (~14% "heavies" indicated by glc) |
| 5 | 50 | — | (1) Dilute with 100 mL $H_2O$<br>(2) pH of aq. phase adjusted from 4.11 to 8.5 with 3.0 mL of conc. $NH_4OH$ | 36 mL clean n-hexane; considerable precipitate present in aqueous phase |
| 6 | — | 50 | (1) Dilute with 100 mL $H_2O$<br>(2) pH of aq. phase adjusted from 0.36 to 7.02 with 5.7 mL of conc. $NH_4OH$ | 41.5 mL clean n-hexane |
| 7 | 50 | 50 | (1) Dilute with 200 mL $H_2O$<br>(2) pH of aq. phase adjusted from 1.16 to 8.7 with 16 mL of $NH_4OH$ (pH 13.11) | 48 mL n-hexane (some "heavies" indicated by glc); considerable precipitate in aqueous phase |
| 8 | 50 | 50 | (1) Add to 100 mL $H_2O$<br>(2) Add 6.5 mL $NH_4OH$ to neutralize | Formed a clear n-hexane layer and a transparent aqueous layer; Formed thick amounts of solids in aqueous layer, but no emulsions observed |
| 9 | 50 | 50 | (1) Add to 50 mL $H_2O$<br>(2) pH adjusted from 0.36 to 1.5 with 9.0 mL $NH_4OH$<br>(3) pH adjusted from 1.5 to 9 with 50 mL $H_2O$ | Formed a clear n-hexane layer and a transparent aqueous layer, no emulsions observed; Solids in aqueous layer became too thick to stir; Reduced thickness of aqueous layer permitting stirring to resume |
| 10 | 50 | 50 | (1) Add to 150 mL $H_2O$ | Formed a clear n-hexane layer |

TABLE I-continued

| Run | Volume, mL Solution #1 | Solution #2 | Treatment | Result |
|---|---|---|---|---|
|  |  |  | (2) pH adjusted to neutral with conc. NH₄OH | and a transparent aqueous layer, no emulsions observed; Some solids present, no emulsions observed, aqueous layer still flows, superior to runs 8 and 9 |
| 11 | 50 | 50 | (1) Dilute with 150 mL H₂O, organic and aqueous phases separated | 69 mL clean n-hexane and substantially clear aqueous phase; |
|  |  |  | (2) pH of aqueous phase adjusted from 0.8 to 7.0 with 12 mL conc. NH₄OH | Filtered out 13 g of suspended solids |
| 12 | 50 | 50 | (1) Dilute with 50 mL H₂O | 58 mL clean n-hexane and substantially clear, free flowing aqueous phase; |
|  |  |  | (2) pH of aqueous phase adjusted from 0.6 to 7.0 with 45 mL conc. NH₄OH | Non-pourable, semi-solid mass, unfilterable |
| 13 | 50 | 50 | (1) Dilute with 200 mL H₂O | 72 mL clean n-hexane and clear aqueous phase (no solids); |
|  |  |  | (2) pH of aqueous phase adjusted from 0.8 to 7.0 with 11 mL conc. NH₄OH | Filtered out 9 g of suspended solids |
| 14 | 50 | 50 | (1) Dilute with 150 mL H₂O | 63 mL clean n-hexane and substantially clear aqueous phase; |
|  |  |  | (2) pH of aqueous phase adjusted from 0.7 to 9.0 with 16 mL conc. NH₄OH | Solids began forming above pH 7.3 at pH 9.0 aqueous phase gelled to unfilterable, semi-solid mass |
| 15 | 70 | 30 | (1) Dilute with 150 mL H₂O | 58 mL clean n-hexane and essentially clear aqueous phase; |
|  |  |  | (2) pH of aqueous phase adjusted from 0.8 to 7.0 with 17 mL conc. NH₄OH | Considerable solids formed, aqueous phase thickened to unpourable, unfilterable fluid |
| 16 | 30 | 70 | (1) Dilute with 150 mL H₂O | 65 mL clean n-hexane and clear aqueous phase (no solids); |
|  |  |  | (2) pH of aqueous phase adjusted from 0.6 to 7.0 with 21 mL conc. NH₄OH | Considerable solids formed aqueous phase thickened a difficult to pour, unfilterable fluid. |

From the results presented in Table I, it will be seen that solutions #1 and #2 can each be treated separately to recover clean n-hexane suitable for recycle, as shown in runs 3 and 5. Run 3 required 300 mL of water to obtain 42 mL of n-hexane from 50 mL of solution #2, while run 5 required an additional 100 mL of water to obtain 36 mL of n-hexane from 50 mL of solution #1. Run 3 required 79 mL of 1N potassium hydroxide to adjust pH while run 5 required 3.0 mL of concentrated ammonium hydroxide to adjust pH. Clearly the processes of runs 3 and 5 require considerable sample handling and relatively large volumes of water for their practice. Of the several attempts to treat the combined solutions #1 and #2 (runs 7-16), the treatments performed in runs 10, 11 and 13 resulted in substantial recovery of n-hexane and sufficient dissolution of solids to allow convenient handling of the wash water and filtration of the solids dissolved therein. Thus, depending on the concentration of impurities in solutions #1 and #2, the addition of a volume of wash water at least equal to 1.5 times the total volume of combined solutions #1 and #2 is expected to result in a clean n-hexane phase and an aqueous phase containing minimal quantities of solids and/or gels thus permitting effective handling of the aqueous phase. Solution #1 will generally be present in an amount in the range between 30 and 70 parts by volume, and solution #2 will generally be present in an amount in the range between 70 and 30 parts by volume. More preferably, solution #1 will be present in an amount in the range from about 40 to about 60 parts by volume, and solution #2 will be present in an amount in the range from about 60 to about 40 parts by volume. It is presently preferred that solutions #1 and #2 be present in generally equal parts by volume in the performance of the process of the present invention. In the performance of the process of the present invention, it is also deemed to be advantageous to adjust the pH of the aqueous phase of the combined solutions #1 and #2 through the addition thereto of a suitable chemical base, such as, for example, potassium hydroxide or ammonium hydroxide. It is generally preferred to raise the pH of the aqueous phase of the combined solutions #1 and #2 to a value less than pH 9, and preferably to neutral or about pH 7.

While this invention has been described in detail for the purpose of illustration, it is not to be construed as limited thereby, but is intended to cover all the changes and modifications within the spirit and scope thereof.

We claim:

1. In a process for preparation of a catalyst for the polymerization of olefins which comprises mixing a metal halide compound and a transition metal compound, allowing said thus mixed compounds to react to produce a reaction product and then contacting said reaction product with a precipitating agent to produce a solid reaction product and further contacting said solid reaction product with a transistion metal tetrahalide to produce a solid catalyst product, wherein all the above steps are conducted in a suitable organic diluent and wherein the solid catalyst product is washed at least once in a suitable organic diluent, the purification of effluent organic diluent by a process comprising the following steps:

(a) collecting separate portions of said organic diluents which have been respectively contacted with said precipitating agent and said transition metal tetrahalide, (b) combining said separate portions of said organic diluent in a volume ratio range between 30:70 to about 70:30 with an amount of water equal to at least about 1.5 times the volume of said thus combined separate portions of said organic diluent to produce an acidic combined diluent mixture, (c) separating the resulting organic and aqueous phases of said combined diluent mixture, and (d) recovering treated organic diluent from said organic phase for further purification and recycling in said process for preparation of a catalyst.

2. A process in accordance with claim 1 wherein said metal halide compound is selected from the group consisting of metal dihalide compounds and metal hydroxyhalide compounds and said metal of said metal halide compound is selected from among the metals in Groups IIA and Group IIB of the Periodic Table of the Elements; the transition metal of the transition metal compound is selected from among the transition metals in Group IVB and Group VB of the Periodic Table of the Elements; and said precipitating agent is selected from the group consisting of organometallic compounds in which the metal is selected from the metals of groups I, II, and III of the Periodic Table of the Elements, halides and oxygen-containing halides of elements selected from Groups IIIA, IVA, IVB, VA and VB of the Periodic Table of the Elements, hydrogen halides and organic acid halides expressed as the formula

wherein R' is an alkyl, aryl or cycloalkyl group or combinations thereof containing from 1 to about 12 carbon atoms and X is a halogen atom.

3. A process in accordance with claim 2 wherein said metal halide compound is a magnesium dihalide, said transition metal of the transition metal compound is selected from the group consisting of titanium, zirconium and vanadium, and said organometallic compound is selected from the group consisting of lithium alkyls, Grignard reagents, dihydrocarbyl magnesium compounds and organoaluminum compounds.

4. A process in accordance with claim 3 wherein said magnesium dihalide compound is magnesium dichloride, said transition metal compound is selected from the group consisting of titanium tetrahydrocarbyloxides, titanium tetraimides, titanium tetraamides and titanium tetramercaptides, and wherein said organoaluminum compound consists essentially of an organoaluminum halide compound selected from the group consisting of dihydrocarbylaluminum monohalides of the formula

monohydrocarbylaluminum dihalides of the formula

and hydrocarbylaluminum sesquihalides of the formula

wherein each R in each formula is individually selected from the group of alkyl, cycloalkyl, aryl, alkaryl and aralkyl hydrocarbon radicals, each containing from 1 to about 20 carbon atoms per radical, and wherein each R can be the same or different, and wherein each X is a halogen atom and can be the same or different.

5. A process in accordance with claim 4 wherein said transition metal compound is a titanium tetrahydrocarbyloxide selected from the group expressed by the general formula

wherein each R is individually selected from the group consisting of alkyl, cycloalkyl, aryl, alkaryl and aralkyl hydrocarbon radicals, each containing from one to about 20 carbon atoms per radical, and wherein each R can be the same or different, and said organoaluminum halide compound is ethylaluminum sesquichloride.

6. A process in accordance with claim 5 wherein said hydrocarbyl radicals of said titanium tetrahydrocarbyloxide compounds contain from one to about 10 carbon atoms per radical, and said transition metal tetrahalide is titanium tetrachloride.

7. A process in accordance with claim 6 wherein said titanium tetrahydrocarbyloxide compound is titanium tetraethoxide.

8. A process in accordance with claim 1 wherein said organic diluent is an inert fluid which is liquid under process conditions and is selected from the group consisting of saturated and aromatic hydrocarbons having from 1 to about 16 carbon atoms, halogenated hydrocarbons, saturated ethers including saturated cyclic ethers and mixtures of two or more thereof.

9. A process in accordance with claim 8 wherein said organic diluent is selected from the group consisting of normal alkanes having from 5 to 10 carbon atoms and mixtures of any two or more thereof.

10. A process in accordance with claim 9 wherein said organic diluent is n-hexane.

11. A process in accordance with claim 1 wherein the aqueous phase of said combined diluent mixture is neutralized with a chemical base.

12. A process in accordance with claim 11 wherein said chemical base is selected from the group consisting of ammonia, ammonium hydroxide, basic nitrogen-containing compounds and alkali metal hydroxides.

13. A process in accordance with claim 1 wherein said separate portions of said organic diluents contain concentrations of said precipitating agent or said transition metal tetrahalide of up to about 20 percent by weight.

14. A process in accordance with claim 1 wherein said combined separate portions of said organic diluents are combined with an amount of water effective to prevent the formation of excessive amounts of solids and/or gels.

15. A process in accordance with claim 1 wherein the product of said reactants is further treated with ethylene gas prior to treatment with said transition metal tetrahalide.

16. A process in accordance with claim 1 wherein said precipitating agent is an organoaluminum compound and wherein said separate portions of said organic diluents are combined in such proportions that said combined diluent mixture contains at least two moles of said transition metal tetrahalide per mole of aluminum in said organoaluminum compound.

17. A process in accordance with claim 1 wherein an acid is added to said combined diluent mixture.

18. A process in accordance with claim 17 wherein said acid is a water-soluble halo-acid.

19. A process in accordance with claim 1 wherein the separate portions of said organic diluents are present in step (b) in a volume ratio range from about 40:60 to about 60:40.

20. A process in accordance with claim 1 wherein the separate portions of said organic diluents are present in step (b) in generally equal parts by volume.

21. A process in accordance with claim 20 wherein the pH of the aqueous phase of the acidic combined diluent mixture is raised to a value less than pH 9.

22. A process in accordance with claim 20 wherein the pH of the aqueous phase of the acidic combined diluent mixture is adjusted to neutral.

23. A process in accordance with claim 1 wherein the pH of the aqueous phase of the acidic combined diluent mixture is raised to a value less than pH 9.

24. A process in accordance with claim 1 wherein the pH of the aqueous mixture is adjusted to neutral.

25. A process in accordance with claim 1 characterized further to include washing said combined diluent mixture with said water.

26. A process for the purification of effluent organic diluent from a catalyst preparation process wherein said effluent organic diluent is recovered in separate diluent portions containing a precipitating agent and a transition metal tetrahalide, respectively, said process comprising the following steps:
(a) combining said separate organic diluent portions in a volume ratio range between 30:70 and 70:30 with an amount of water equal to at least about 1.5 times the volume of said thus combined separate organic diluent portions to produce an acidic combined diluent mixture,
(b) separating the resulting organic and aqueous phases of said combined diluent mixture, and
(c) recovering treated organic diluent from said organic phase for further purification and recycling to said catalyst preparation process.

27. A process in accordance with claim 26 characterized further to include washing said combined diluent mixture with said water.

28. A process in accordance with claim 26 wherein the separate portions of said organic diluents are present in step (a) in a volume ratio range from about 40:60 to about 60:40.

29. A process in accordance with claim 26 wherein the pH of the aqueous phase of the acidic combined diluent mixture is raised to a value less than pH 9.

* * * * *